(12) United States Patent
Mishima (10) Patent No.: US 12,065,146 B2
(45) Date of Patent: Aug. 20, 2024

(54) LANE CHANGE INFORMATION SHARING DEVICE AND VEHICLE

(71) Applicant: Isuzu Motors Limited, Tokyo (JP)

(72) Inventor: Yasuyuki Mishima, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 493 days.

(21) Appl. No.: 17/275,687

(22) PCT Filed: Sep. 13, 2019

(86) PCT No.: PCT/JP2019/036059
§ 371 (c)(1),
(2) Date: Mar. 12, 2021

(87) PCT Pub. No.: WO2020/054836
PCT Pub. Date: Mar. 19, 2020

(65) Prior Publication Data
US 2022/0097710 A1    Mar. 31, 2022

(30) Foreign Application Priority Data

Sep. 13, 2018   (JP) ................................ 2018-171260

(51) Int. Cl.
*B60W 30/14*    (2006.01)
*B60W 30/18*    (2012.01)
(Continued)

(52) U.S. Cl.
CPC .... *B60W 30/18163* (2013.01); *B60W 30/143* (2013.01); *B60W 40/04* (2013.01); *G08G 1/096791* (2013.01)

(58) Field of Classification Search
CPC ......... B60W 30/18163; B60W 30/143; B60W 40/04; B60W 2556/65; B60W 50/14;
(Continued)

(56) References Cited

U.S. PATENT DOCUMENTS

| 9,975,483 B1 * | 5/2018 | Ramaswamy ......... B60Q 11/00 |
| 2010/0021011 A1 | 1/2010 | Shida |

(Continued)

FOREIGN PATENT DOCUMENTS

| CN | 102938199 | 9/2011 |
| CN | 106530833 | 3/2017 |

(Continued)

OTHER PUBLICATIONS

International Search Report and the Written Opinion Dated Dec. 3, 2019 From the International Searching Authority Re. Application No. PCT/JP2019/036059 and Its Translation of Search Report Into English. (10 Pages).

*Primary Examiner* — Abby Y Lin
*Assistant Examiner* — Hossam M Abd El Latif (57) ABSTRACT

Provided are a lane change information sharing device and a vehicle with which information for making a lane change can be shared between vehicles forming a vehicle group. The lane change information sharing device is equipped with: a determination section for determining, when a first vehicle forming a vehicle group changes lanes from a first lane to a second lane, which is adjacent to the first lane, whether an obstruction exists in a virtual route from the first lane to the second lane of the first vehicle; and an information-sharing control execution section for executing a control for transmitting information about the first possible lane change region, which is a region that can be used by the first vehicle when the first vehicle changes lanes from the first lane to the second lane, to a second vehicle forming the vehicle group together with the first vehicle, when the determination section has determined that no obstruction exists.

7 Claims, 3 Drawing Sheets

(51) Int. Cl.
 *B60W 40/04* (2006.01)
 *B60W 50/14* (2020.01)
 *G05D 1/00* (2024.01)
 *G08G 1/0967* (2006.01)
 *G08G 1/16* (2006.01)

(58) Field of Classification Search
 CPC ......... G05D 1/0295; G05D 2201/0213; G08G 1/096791; G08G 1/167
 USPC .......................................................... 701/93
 See application file for complete search history.

(56) References Cited

U.S. PATENT DOCUMENTS

| | | | |
|---|---|---|---|
| 2014/0180567 A1* | 6/2014 | Fetsch | .................... G08G 1/168 701/301 |
| 2016/0091896 A1 | 3/2016 | Maruyama | |
| 2017/0011633 A1* | 1/2017 | Boegel | ............ B60W 30/18163 |
| 2018/0259967 A1* | 9/2018 | Frazzoli | ............ B60W 30/0956 |
| 2019/0193738 A1* | 6/2019 | Oh | ........................... G08G 1/22 |
| 2019/0311627 A1* | 10/2019 | Wendt | .................... G08G 1/167 |

FOREIGN PATENT DOCUMENTS

| | | | |
|---|---|---|---|
| CN | 107672592 | 2/2018 | |
| JP | H11250400 A * | 2/1998 | |
| JP | 11-250400 | 9/1999 | |
| JP | 2002-266672 | 9/2002 | |
| JP | 2002266672 A * | 9/2002 | |
| JP | 2009-040351 | 2/2009 | |
| JP | 2009-116723 | 5/2009 | |
| JP | 2011-186907 | 9/2011 | |
| JP | 2011186907 A * | 9/2011 | ............... G08G 1/22 |
| JP | 2015-075889 | 4/2015 | |
| JP | 2016-071513 | 5/2016 | |
| JP | 2017-100681 | 6/2017 | |
| WO | WO 2020/054836 | 3/2020 | |

* cited by examiner

FIG. 1

FORWARD DIRECTION ⇄ REARWARD DIRECTION

LANE CHANGE INFORMATION SHARING DEVICE AND VEHICLE

TECHNICAL FIELD

The present disclosure relates to a lane change information sharing apparatus and a vehicle.

BACKGROUND ART

In a case where a plurality of vehicles forms a vehicle group and travels in a platoon, a vehicle forming the vehicle group may change lanes to overtake a vehicle outside the vehicle group, for example.

Patent Literature (hereinafter, referred to as "PTL") 1 discloses a driving support control apparatus configured to determine whether a lane change is possible, to present a lane change proposal to a driver in a case where it is determined that the lane change is possible, and to execute a control for the lane change in a case where the driver agrees to the lane change proposal.

CITATION LIST

Patent Literature

PTL 1
Japanese Patent Application Laid-Open No. 2016-71513

SUMMARY OF INVENTION

Technical Problem

In the driving support control apparatus described in PTL 1, however, information for performing a lane change is not shared between vehicles forming a vehicle group so that the driving support control apparatus described in PTL 1 has a problem that there is room for improvement from the viewpoint of safety, for example.

An object of the present disclosure is to provide a lane change information sharing apparatus and a vehicle enabling information for performing a lane change to be shared between vehicles forming a vehicle group.

Solution to Problem

To achieve the above-mentioned object, a lane change information sharing apparatus according to the present disclosure includes:
  a determination section that determines whether an obstruction exists on a virtual route of a first vehicle in a case where the first vehicle changes from a first lane to a second lane, the virtual route being directed from the first lane to the second lane, the first vehicle forming a vehicle group, the second lane being a lane adjacent to the first lane;
  an information generation section that generates information about a first lane changeable region, the first lane changeable region being a region available for the first vehicle in a case where the first vehicle changes from the first lane to the second lane; and
  an information-sharing control execution section that executes a control for a transmission of the information about the first lane changeable region generated by the information generation section to a second vehicle in a case where the determination section has determined that the obstruction does not exist, the second vehicle forming the vehicle group together with the first vehicle.

Further, a vehicle according to the present disclosure includes the lane change information sharing apparatus.

Advantageous Effects of Invention

The present disclosure enables information for performing a lane change to be shared between vehicles forming a vehicle group.

DESCRIPTION OF EMBODIMENTS

Hereinafter, an embodiment of the present disclosure will be described with reference to the accompanying drawings.

Figure 1:
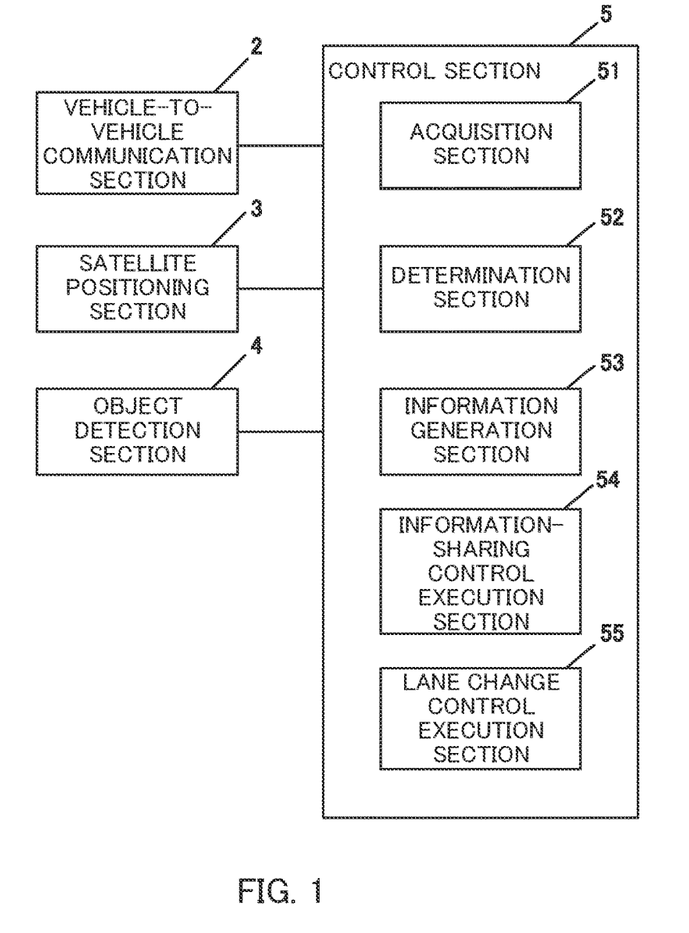
FIG. 1 is a control block diagram schematically illustrating a configuration of a lane change information sharing apparatus according to an embodiment of the present disclosure.

FIG. 1 is a control block diagram schematically illustrating a configuration of lane change information sharing apparatus 1 according to an embodiment of the present disclosure. Lane change information sharing apparatus 1 includes vehicle-to-vehicle communication section 2, satellite positioning section 3, object detection section 4, and control section 5. Lane change information sharing apparatus 1 is provided in each vehicle.

Vehicle-to-vehicle communication section 2 is a communication apparatus that performs transmission and reception between vehicles by using a radio wave of a predetermined frequency band, and exchanges various vehicle-related information between vehicles. The various vehicle-related information herein includes vehicle position information. Note that, the vehicle position information is information measured by satellite positioning section 3.

Satellite positioning section 3 three-dimensionally measures the position of a vehicle. For example, a publicly known global positioning system (GPS) is used for satellite positioning section 3.

Figure 2:
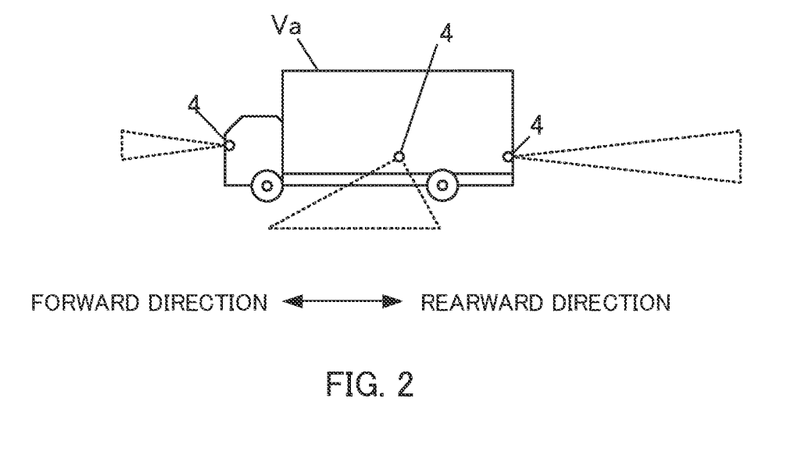
FIG. 2 is a diagram for describing object detection sections.

FIG. 2 illustrates object detection sections 4 provided on front, rear, and lateral surfaces of first vehicle Va, respectively. Object detection section 4 detects e.g. the position of an object existing around first vehicle Va based on information output from at least one of a camera, a finder, a radar apparatus, and the like. Object detection section 4 outputs a detection result to control section 5.

The camera, for example, outputs data of captured images generated by capturing images of front, rear, and lateral sides of first vehicle Va. For example, the camera outputs captured image data to control section 5. As the camera, a known solid-state image sensor such as a charge coupled device (CCD) image sensor and a complementary metal oxide semiconductor (CMOS) image sensor is utilized, for example.

The finder detects a distance to an object by radiating light (irradiation light) around first vehicle Va and receiving scattered light scattered by the object, and outputs a detection result. As the finder, light detection and ranging, laser imaging detection and ranging (LiDAR) is utilized, for example.

The radar apparatus detects at least the position (distance and orientation) of an object by radiating electromagnetic waves around first vehicle Va and receiving electromagnetic waves (reflected waves) reflected by the object, and outputs a detection result.

Control section 5 is formed of a microcomputer including a central processing unit (CPU), a read only memory (ROM), a random access memory (RAM), an input interface, and an output interface. The CPU reads out a program corresponding to processing from the ROM, loads the program into the RAM, and performs a centralized control of operations of each block and the like in cooperation with the loaded program. Note that, in the present embodiment, control section 5 has functions as acquisition section 51, determination section 52, information generation section 53, information-sharing control execution section 54, and lane change control execution section 55. Note that, these functions may be included in an electric control unit (ECU) which is an apparatus that uses an electronic circuit to control each system in a vehicle. Further, any part or all of these functions may be provided separately from the ECU.

Acquisition section 51 acquires a detection result of object detection section 4. Further, acquisition section 51 acquires a measurement result of satellite positioning section 3 (position information about first vehicle Va). Further, acquisition section 51 acquires position information about other vehicles positioned around first vehicle Va via vehicle-to-vehicle communication section 2.

In a case where first vehicle Va changes from a first lane to a second lane that is a lane adjacent to the first lane, determination section 52 determines whether an obstruction exists on a virtual route of first vehicle Va. The virtual route is directed from the first lane to the second lane. Specifically, in a case where a direction of an object with respect to first vehicle Va, which is calculated based on a detection result of object detection section 4, coincides with a direction of a virtual route of first vehicle Va, determination section 52 determines that an obstruction exists on the virtual route of first vehicle Va. The "virtual route" herein includes every route that a vehicle can take when changing lanes. Further, the "obstruction" refers to an object that cannot be recognized as a vehicle.

Information generation section 53 generates information about a first lane changeable region that is a region available for first vehicle Va in a case where first vehicle Va changes from a first lane to a second lane. The information about the first lane changeable region herein refers to a distance (a distance in a vehicle traveling direction) between a vehicle (forward vehicle) and a vehicle (rearward vehicle). The forward vehicle exists within a detection range of object detection section 4 of first vehicle Va (hereinafter, simply referred to as "detection range"), and travels forward from first vehicle Va on the second lane. The rearward vehicle exists within the detection range, and travels rearward from first vehicle Va on the second lane. Note that, in a case where no forward vehicle exists in the detection range, the position of the forward vehicle is replaced with the position of an intersection (of two intersections, the intersection on the front side) of an outer edge of the detection range and the second lane (for example, the center position of the second lane in the width direction). Further, in a case where no rearward vehicle exists in the detection range, the position of the rearward vehicle is replaced with the position of an intersection (of two intersections, the intersection on the rear side) of an outer edge of the detection range and the second lane (for example, the center position of the second lane in the width direction).

Figure 3:
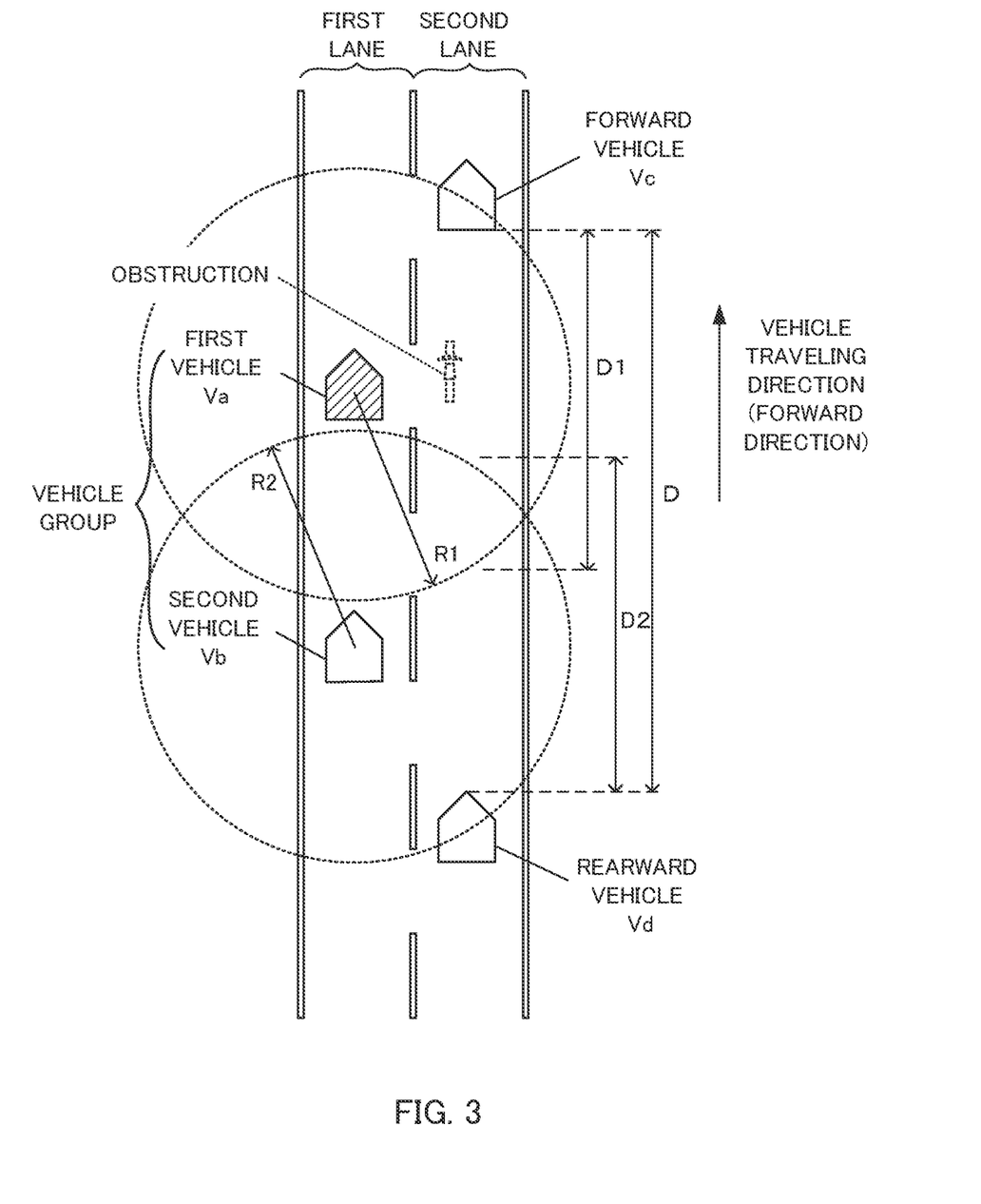
FIG. 3 schematically illustrates vehicles traveling on a first lane and a second lane.

Information-sharing control execution section 54 executes a control for a transmission of information about a first lane changeable region generated by information generation section 53 to second vehicle Vb that forms a vehicle group together with first vehicle Va (see FIG. 3). For example, information-sharing control execution section 54 executes a control of vehicle-to-vehicle communication section 2 such that vehicle-to-vehicle communication section 2 transmits information about a first lane changeable region to second vehicle Vb. Thus, information about a first lane changeable region is shared with second vehicle Vb.

The processing for sharing information about a lane changeable region described above is also performed in second vehicle Vb. That is, in a case where determination section 52 of second vehicle Vb has determined that no obstruction exists on a virtual route of second vehicle Vb, information generation section 53 of second vehicle Vb generates information about a second lane changeable region that is a region available for second vehicle Vb in a case where second vehicle Vb changes from a first lane to a second lane. Further, information-sharing control execution section 54 of second vehicle Vb executes a control for a transmission of information about a second lane changeable region to first vehicle Va. For example, information-sharing control execution section 54 of second vehicle Vb executes a control of vehicle-to-vehicle communication section 2 of second vehicle Vb such that vehicle-to-vehicle communication section 2 of second vehicle Vb transmits information about a second lane changeable region to first vehicle Va.

Acquisition section 51 of first vehicle Va acquires information about a second lane changeable region. Information generation section 53 of first vehicle Va regenerates information about a second lane changeable region acquired by acquisition section 51 into a second lane changeable region viewed from first vehicle Va based on a start distance and an end distance from a second vehicle in the second lane changeable region, lane information about the second vehicle, a time to collision (TTC), position information about the second vehicle, information about a traveling velocity of the second vehicle with respect to the first vehicle, and/or the like.

Information generation section 53 of first vehicle Va updates information about a first lane changeable region by information about a third lane changeable region in which the first lane changeable region and a second lane changeable region are combined. In a case where mention is made of first lane changeable region in the following description, the first lane changeable region includes, unless otherwise specified, a third lane changeable region.

Incidentally, in a case where a lane change is performed, safety of the lane change may decrease depending on traffic conditions or the like. In this case, generation of a lane changeable region is even of no use. Accordingly, in the present embodiment, in a case where a traffic volume is within a range set in advance, information generation section 53 generates information about a first lane changeable region. In other words, in a case where a traffic volume exceeds a range set in advance, information generation section 53 does not generate a first lane changeable region. The traffic volume is measured, for example, by a traffic counter or a traffic camera installed at a predetermined point on the road. The traffic amount measured by a traffic counter or the like is stored, as information for each cell on a map, in a server of a traffic management center, for example. Acquisition unit 51 of first vehicle Va acquires a traffic volume, for example, from a server by mobile phone communication, or from other vehicles by vehicle-to-vehicle communication section 2.

Further, in a case where an intervehicular distance between first vehicle Va and second vehicle Vb (hereinafter, simply referred to as "intervehicular distance") is within a range set in advance, information generation section 53 generates information about a first lane changeable region. In other words, in a case where the intervehicular distance exceeds a range set in advance, information generation section 53 does not generate a first lane changeable region.

In the present embodiment, first vehicle Va has a lane change function whereby a lane change is automatically executed. Lane change control execution section 55 executes a control such that first vehicle Va changes lanes, based on information about a first lane changeable region.

In order that first vehicle Va performs a lane change more safely, a first lane changeable region is preferably as wide as possible. In the present embodiment, lane change control execution section 55 executes a control for an increase or decrease in a traveling velocity of at least one of first vehicle Va and second vehicle Vb such that a first lane changeable region is extended. Note that, it is assumed that second vehicle Vb has a lane change function whereby a lane change is automatically executed. Hereinafter, a case where a control for an extension of a first lane changeable region is executed and a case where a control for an extension of a third lane changeable region is executed will be described separately.

In a case where the control for an extension of a first lane changeable region is executed, lane change control execution section 55 executes a control for an increase or decrease in a traveling velocity of first vehicle Va such that an obstruction is positioned on a boundary line of a range in which a forward vehicle in a vehicle traveling direction is detected by object detection section 4 of first vehicle Va.

In a case where the control for an extension of a third lane changeable region is executed, lane change control execution section 55 executes a control for an increase or decrease in each of the traveling velocities of first vehicle Va and second vehicle Vb such that a range in which an obstruction in a vehicle traveling direction is detected by object detection section 4 of first vehicle Va and a range in which an obstruction in the vehicle traveling direction is detected by object detection section 4 of second vehicle Vb partially overlap, and that first vehicle Va and second vehicle Vb are separated from each other as much as possible. The reason for causing both the ranges described above to partially overlap is that when the ranges do not overlap, a range in which no obstruction is detected exists in a third lane changeable region, and safety in a case where a lane change is performed based on the third lane changeable region is damaged. Further, the reason for separating the vehicles as much as possible is that the more separated the vehicles are from each other, the more a range in which an obstruction is detected spreads in the vehicle traveling direction and a third lane changeable region can be extended correspondingly.

In a case where a condition set in advance is satisfied, lane change control execution section 55 executes a control such that first vehicle Va stops changing lanes. Examples of the condition set in advance include a case where a distance (a distance in a vehicle traveling direction) between first vehicle Va and at least one of a forward vehicle (a vehicle in a forward direction with respect to first vehicle Va in the vehicle traveling direction) and a rearward vehicle (a vehicle in a rearward direction with respect to first vehicle Va in the vehicle traveling direction) on a second lane becomes less than a range set in advance when a lane change is performed. The "stop" herein means both a case where first vehicle Va remains in the middle of a route when changing lanes and a case where first vehicle Va returns to the original position before starting a lane change.

Next, a specific example of lane change information sharing apparatus 1 will be described with reference to FIG. 3. FIG. 3 schematically illustrates vehicles traveling on a first lane and a second lane. FIG. 3 illustrates first vehicle Va and second vehicle Vb as well as forward vehicle Vc and rearward vehicle Vd. First vehicle Va and second vehicle Vb form a vehicle group, and travel in a platoon on the first lane. Forward vehicle Vc and rearward vehicle Vd are vehicles that travels on the second lane and that are outside the vehicle group. Forward vehicle Vc is positioned in a forward direction with respect to first vehicle Va in a vehicle traveling direction. Rearward vehicle Vd is positioned in a rearward direction with respect to first vehicle Va in the vehicle traveling direction. Further, circles of radii R1 and R2 centered at positions of the respective vehicles illustrated in FIG. 3 indicate ranges in which an obstruction can be detected by object detection section 4 of each of the vehicles.

As illustrated in FIG. 3, object detection section 4 of first vehicle Va detects whether an obstruction exists on a virtual route of first vehicle Va.

Acquisition section 51 of first vehicle Va acquires a detection result of object detection section 4. Determination section 52 of first vehicle Va determines whether an obstruction exists on the virtual route of first vehicle Va based on the detection result of object detection section 4.

In a case where determination section 52 has determined that an obstruction exists on the virtual route of first vehicle Va, information generation section 53 of first vehicle Va does not generate a first lane changeable region.

In a case where determination section 52 has determined that no obstruction exists on the virtual route of first vehicle Va, information generation section 53 of first vehicle Va generates information about first lane changeable region D1 (a distance between the position of forward vehicle Vc and the position of an intersection (of two intersections, the intersection on the rear side) of the circumference of the circle of radius R1 and the center position of the second lane in the width direction in the vehicle traveling direction illustrated in FIG. 3). Note that, position information about forward vehicle Vc is determined by a publicly known means. For example, in a case where position information (distance and orientation) about an object detected by object detection section 4 is compared with position information about another vehicle acquired by acquisition section 51 via vehicle-to-vehicle communication section 2 and both the pieces of position information coincides with each other, these pieces of position information are set as vehicle position information.

Information-sharing control execution section 54 of first vehicle Va executes a control of vehicle-to-vehicle communication section 2 of first vehicle Va such that vehicle-to-vehicle communication section 2 of first vehicle Va transmits the information about first lane changeable region D1 generated by information generation section 53 to second vehicle Vb.

In the same manner, in a case where determination section 52 of second vehicle Vb has determined that no obstruction exists on a virtual route of second vehicle Vb, information generation section 53 of second vehicle Vb generates information about second lane changeable region D2 (a distance between the position of an intersection (of two intersections, the intersection on the front side) of the circumference of the circle of radius R2 and the center position of the second lane in the width direction and the position of rearward vehicle Vd in the vehicle traveling direction illustrated in FIG. 3). Note that, position information about rearward vehicle Vd is also determined by a publicly known means in the same manner as with the position information about forward vehicle Vc.

Information-sharing control execution section 54 of second vehicle Vb executes a control of vehicle-to-vehicle communication section 2 of second vehicle Vb such that vehicle-to-vehicle communication section 2 of second vehicle Vb transmits the information about second lane changeable region D2 generated by information generation section 53 to first vehicle Va.

Information-sharing control execution section 54 of first vehicle Va executes a control of vehicle-to-vehicle communication section 2 of first vehicle Va such that vehicle-to-vehicle communication section 2 of first vehicle Va receives the information about second lane changeable region D2. Acquisition section 51 of first vehicle Va acquires the information about second lane changeable region D2. Information generation section 53 of first vehicle Va updates the information about first lane changeable region D1 by information about third lane changeable region D in which first lane changeable region D1 and second lane changeable region D2 are combined.

Lane change control execution section 55 of first vehicle Va executes a control such that first vehicle Va changes lanes, based on third lane changeable region D as first lane changeable region D1.

Figure 4:
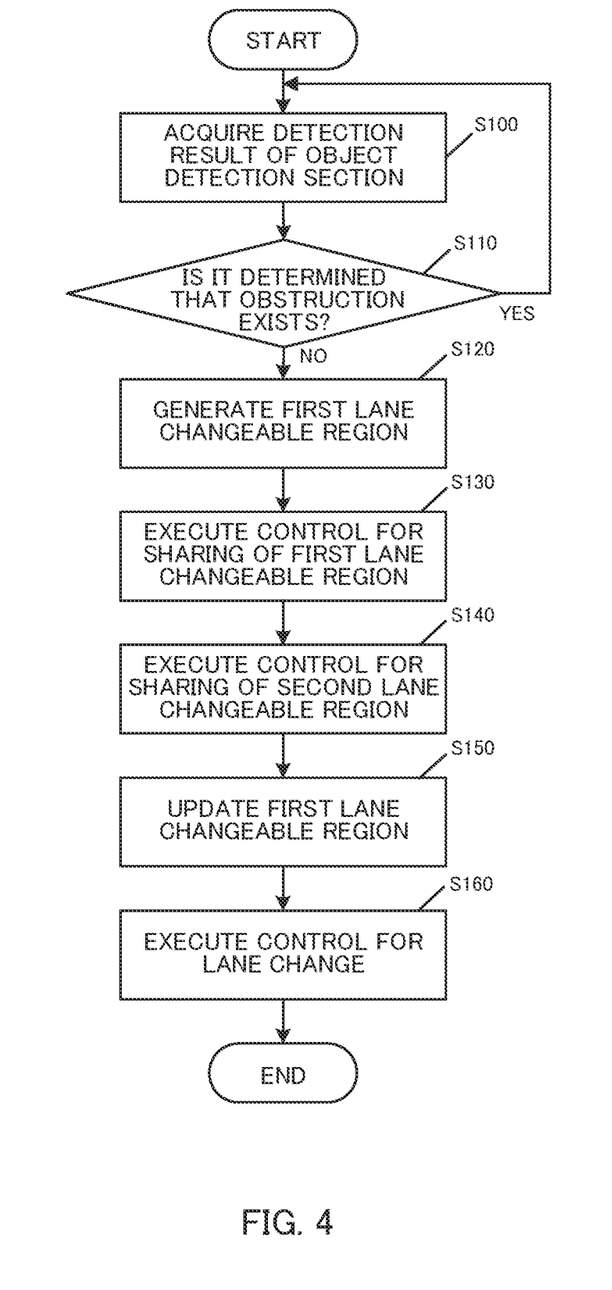
FIG. 4 is a flowchart illustrating an exemplary sharing processing operation of lane change information according to the embodiment of the present disclosure.

Next, a sharing processing operation of lane change information according to the embodiment of the present disclosure will be described with reference to FIG. 4. FIG. 4 is a flowchart illustrating an exemplary sharing processing operation of lane change information according to the embodiment of the present disclosure. This flow is started as appropriate in a case where a plurality of vehicles forms a vehicle group and travels in a platoon. Note that, hereinafter, first vehicle Va and second vehicle Vb that form a vehicle group will be described as traveling on a first lane.

First, in step S100 indicated in FIG. 4, acquisition section 51 of first vehicle Va acquires a detection result of object detection section 4.

Next, in step S110, determination section 52 of first vehicle Va determines whether an obstruction exists on a virtual route of first vehicle Va based on the detection result of object detection section 4. In a case where determination section 52 has determined that an obstruction exists (step S110: YES), the processing returns to the beginning of step S100. In a case where determination section 52 has determined that no obstruction exists (step S110: NO), the processing transits to step S120.

In step S120, information generation section 53 of first vehicle Va generates information about a first lane changeable region.

Next, in step S130, information-sharing control execution section 54 of first vehicle Va executes a control of vehicle-to-vehicle communication section 2 such that vehicle-to-vehicle communication section 2 transmits the information about the first lane changeable region to second vehicle Vb.

Next, in step S140, information-sharing control execution section 54 of first vehicle Va executes a control of vehicle-to-vehicle communication section 2 such that vehicle-to-vehicle communication section 2 receives information about a second lane changeable region from second vehicle Vb. Thus, acquisition section 51 of first vehicle Va acquires the information about the second lane changeable region. Note that, in a case where information generation section 53 of second vehicle Vb does not generate a second lane changeable region, acquisition section 51 of first vehicle Va acquires information indicating that no second lane changeable region exists (second lane changeable region D2 illustrated in FIG. 3=0).

Next, in step S150, information generation section 53 of first vehicle Va updates the information about the first lane changeable region by information about a third lane changeable region in which the first lane changeable region and the second lane changeable region are combined.

Next, in step S160, lane change control execution section 55 executes a control such that first vehicle Va changes from the first lane to the second lane, based on the updated information about the first lane changeable region.

Lane change information sharing apparatus 1 according to the embodiment described above includes: determination section 52; information generation section 53; and information-sharing control execution section 54. Determination section 52 determines whether an obstruction exists on a virtual route of first vehicle Va forming a vehicle group, in which the virtual route is directed from a first lane to a second lane, in a case where first vehicle Va changes from the first lane to the second lane that is a lane adjacent to the first lane. Information generation section 53 generates information about a first lane changeable region that is a region available for first vehicle Va in a case where first vehicle Va changes from the first lane to the second lane. Information-sharing control execution section 54 executes a control for a transmission of the information about the first lane changeable region generated by information generation section 53 to second vehicle Vb forming the vehicle group together with first vehicle Va in a case where determination section 52 has determined that no obstruction exists. Since the information about the first lane changeable region is shared between the vehicles forming the vehicle group thereby, it is possible to improve safety of a platoon traveling.

Further, according to the embodiment described above, information-sharing control execution section 54 of first vehicle Va executes a control for receiving information about a second lane changeable region from second vehicle Vb. The second lane changeable region is a region available for second vehicle Vb in a case where second vehicle Vb changes from the first lane to the second lane. Further, information generation section 53 of first vehicle Va updates the information about the first lane changeable region by information about a third lane changeable region in which the first lane changeable region and the second lane changeable region are combined. Since a region available for first vehicle Va when changing lanes is extended thereby, it is possible to further improve safety of a platoon traveling.

Further, in the embodiment described above, information generation section 53 generates first lane changeable region D1 as a distance between the position of forward vehicle Vc and the position of an intersection of the circumference of the circle of radius R1 and the center position of the second lane in the width direction as illustrated in FIG. 3, but the present invention is not limited thereto. For example, first lane changeable region D1 may also be generated as a time to collision that is a value obtained by dividing the above-mentioned distance by a relative velocity of first vehicle Va with respect to forward vehicle Vc.

Further, in the embodiment described above, in a case where the determination section has determined that no obstruction exists, the information generation section generates information about a first lane changeable region. However, the information generation section may also generate information about a first lane changeable region regardless of whether an obstruction exists. In this case, in a case where the determination section has determined that no obstruction exists, information about a first lane changeable region is transmitted to the second vehicle, whereas in a case where the determination section has determined that an obstruction exists, information about a first lane changeable region is not transmitted to the second vehicle.

Further, in the embodiment described above, in a case where a first lane changeable region and a second lane changeable region are combined, a reliability level of the combined lane changeable region may also be set and be shared between vehicles forming a vehicle group. Further, in a case where the reliability level is within a level set in advance, a control for a lane change may also be performed.

The embodiments described above are merely examples of specific implementation of the present disclosure, and the technical scope of the present disclosure should not be restrictively interpreted by these embodiments. That is, the present disclosure may be implemented in various forms without departing from the spirit thereof or the major features thereof.

INDUSTRIAL APPLICABILITY

The present disclosure is suitably used for a vehicle including a lane change information sharing apparatus which requires information for performing a lane change to be shared between vehicles forming a vehicle group.

This application is based on Japanese Patent Application No. 2018-171260, filed on Sep. 13, 2018, the contents of which are incorporated herein by reference.

REFERENCE SIGNS LIST

Va First vehicle
Vb Second vehicle
Vc Forward vehicle
Vd Rearward vehicle
1 Lane change information sharing apparatus
2 Vehicle-to-vehicle communication section
3 Satellite positioning section
4 Object detection section
5 Control section
51 Acquisition section
52 Determination section
53 Information generation section
54 Information-sharing control execution section
55 Lane change control execution section

The invention claimed is:

1. A lane change information sharing apparatus, comprising:
a determination circuit that determines whether an obstruction exists on a virtual route of a first vehicle based on a detection result of a detection section in a case where the first vehicle changes from a first lane to a second lane, the virtual route being directed from the first lane to the second lane, the first vehicle forming a vehicle group, the second lane being a lane adjacent to the first lane, the detection section detecting that the obstruction exists around the first vehicle;
an information generation circuit that generates information about a first lane changeable region rearward from a forward vehicle based on a position of the forward vehicle traveling forward from the first vehicle on the second lane, the first lane changeable region being a region available for the first vehicle in a case where the first vehicle changes from the first lane to the second lane;
an information-sharing control execution circuit that executes a control of a communication section for a transmission of the information about the first lane changeable region generated by the information generation circuit to a second vehicle, and executes a control of the communication section for receiving from the second vehicle information about a second lane changeable region generated forward from a rearward vehicle based on a position of the rearward vehicle traveling rearward from the second vehicle on the second lane, in a case where the determination circuit has determined that the obstruction does not exist, the second vehicle forming the vehicle group together with the first vehicle, the second lane changeable region being a region available for the second vehicle; and
a lane change control execution circuit that generates information for the vehicle group to change lanes, based on combined information of the first lane changeable region and the second lane changeable region, and executes a control of the communication section for a transmission of information for the vehicle group to change lanes to the second vehicle, wherein:
the lane change control execution circuit executes a control of the communication section for transmission, to the second vehicle, of information for an increase or decrease in a traveling velocity of at least one of the first vehicle and/or the second vehicle such that a distance between the first vehicle and the second vehicle increases while maintaining a travel order of the first vehicle and the second vehicle within a range where a first range in which the first vehicle detects the obstruction and a second range in which the second vehicle detects the obstruction partially overlap each other, and
the information generation circuit generates the information about the first lane changeable region after the distance between the first vehicle and the second vehicle increases.

2. The lane change information sharing apparatus according to claim 1, wherein:
the information generation circuit updates the information about the first lane changeable region by information in which the first lane changeable region and the second lane changeable region are combined, and
the lane change control execution circuit generates information for the vehicle group to change lanes, based on the updated information about the first lane changeable region.

3. The lane change information sharing apparatus according to claim 1, wherein in a case where a traffic volume is within a range set in advance, the information generation circuit generates the information about the first lane changeable region.

4. The lane change information sharing apparatus according to claim 1, wherein in a case where an intervehicular distance between the first vehicle and the second vehicle is within a range set in advance, the information generation circuit generates the information about the first lane changeable region.

5. The lane change information sharing apparatus according to claim 1, wherein the lane change control execution circuit executes a control of the communication section for a transmission to the second vehicle of information for an increase or decrease in a traveling velocity of at least one of the first vehicle and the second vehicle such that the first lane changeable region is extended.

6. The lane change information sharing apparatus according to claim 1, wherein in a case where a condition set in advance is satisfied, the lane change control execution circuit executes a control of the communication section for a transmission to the second vehicle of information such that the first vehicle stops changing lanes.

7. A vehicle, comprising the lane change information sharing apparatus according to claim 1.

* * * * *